(12) United States Patent
Chien et al.

(10) Patent No.: US 7,665,706 B2
(45) Date of Patent: Feb. 23, 2010

(54) SUCTION-ADHERED DEVICE WITH SUCTION POWER DETECTION MECHANISM

(76) Inventors: Li-Sheng Chien, 5F., No. 67, Lane 201, Jhongjheng Road., Shihlin District, Taipei City 111 (TW); Ho Chien-Chang, 5F., No. 8, Alley 1, Lane 25, Fongjiang Rd., Taishan Township, Taipei County 243 (TW)

( * ) Notice: Subject to any disclaimer, the term of this patent is extended or adjusted under 35 U.S.C. 154(b) by 492 days.

(21) Appl. No.: 11/619,198

(22) Filed: Jan. 3, 2007

(65) Prior Publication Data
US 2008/0156958 A1 Jul. 3, 2008

(51) Int. Cl.
*F16M 13/00* (2006.01)
(52) U.S. Cl. .................... 248/542; 248/206.3; 248/363; 4/576.1; 4/611
(58) Field of Classification Search .................. 4/576.1, 4/577.1, 611; 248/542, 205.5, 467, 537, 248/205.7, 205.8, 206.1, 206.2, 206.3, 309.3, 248/363
See application file for complete search history.

(56) References Cited

U.S. PATENT DOCUMENTS

| | | | | |
|---|---|---|---|---|
| 4,944,478 A | * | 7/1990 | Sullivan | 248/205.7 |
| 6,896,228 B1 | * | 5/2005 | Lu | 248/205.8 |
| 7,066,434 B2 | * | 6/2006 | Kwok | 248/205.8 |
| 7,475,860 B2 | * | 1/2009 | Chien et al. | 248/363 |
| 2006/0026748 A1 | * | 2/2006 | Kwok | 4/576.1 |

* cited by examiner

*Primary Examiner*—J. Allen Shriver, II
*Assistant Examiner*—Bradley H Duckworth
(74) *Attorney, Agent, or Firm*—Schmeiser, Olsen & Watts

(57) ABSTRACT

A suction-adhered device includes a main body, suction cup units, and suction power detection units. The main body is provided with chambers. Each of the suction cup units includes a suction cup received in the chamber, and a safety lever projected from the upper side of the main body and movably connected to the suction cup with an elastic element mounted between them. Each of the suction power detection units includes a probe received in a long hole near the chamber to partially project from the long hole, and an indicating member visible via a window formed on a top of the main body above the long hole. When the suction cup is loosened from a mounting surface, the indicating member is turned by an elastic element to show a warning indicating zone thereof, so that a user may be timely warned to re-mount the main body.

7 Claims, 3 Drawing Sheets

SUCTION-ADHERED DEVICE WITH SUCTION POWER DETECTION MECHANISM

FIELD OF THE INVENTION

The present invention relates to a suction-adhered device, and more particularly to a suction-adhered device with suction power detection mechanism to timely detect any loosened suction cups and prevent the suction-adhered device from falling to cause any accident.

BACKGROUND OF THE INVENTION

Suction-adhered devices with suction cups are widely employed in daily life. In the past years, a safety rail or grab rail is usually mounted at a suitable position in a bathroom to prevent accidents caused by wet and slippery floor. Such safety or grab rail includes a transverse bar and two L-shaped mounting sections provided at two ends of the transverse bar. To install the safety or grab rail on a wall surface, an electric hand drill must be used to drill holes on the wall, and a plurality of screws are used to fixedly connect the mounting sections to the drilled holes, so that the safety or grab rail is safe for gripping by a user to prevent accidents possibly caused by the wet and slippery floor in the bathroom.

While the conventional safety or grab rail is useful in protecting a user against accidents caused by wet and slippery floor, it requires complicate and troublesome mounting procedures, such as drilling holes and fastening screws. And, it is uneasy to dismount and/or replace such conventional safety or grab rail. Moreover, when the safety or grab rail has been dismounted or replaced, there are holes left on the wall surface to adversely affect the appearance of the bathroom.

To overcome the problems with the conventional safety or grab rail, a suction-adhered safety or grab rail allowing easy mounting and dismounting has been developed. The suction-adhered safety or grab rail includes a handle bar, and two suction cups provided at two ends of the handle bar. The suction cups are equipped with a safety lever each. The suction-adhered safety or grab rail may be directly installed on the wall surface via the suction cups without using any tools. When the safety levers are pressed, the suction cups are firmly adhered to a desired position on the tiled wall surface of the bathroom. Therefore, the problem of screwing the safety rail to the wall surface may be solved.

However, the suction cups can only be suction-adhered to a smooth wall surface, such as the tiled wall surface. Moistures and vapors frequently existed in the bathroom tend to cause loosened and slipped suction cups while the safety levers are still located at the fastened position without being sprung up by an elastic element. That is, the suction-adhered safety or grab rail in a loosened or slipped position looks just as usual, and a user might be not aware of any potential dangers thereof. When the user firmly grips at the safety rail mounted on the wall via the loosened or slipped suction cups, accidents and unexpected injuries will happen.

SUMMARY OF THE INVENTION

It is therefore a primary object of the present invention to provide a suction-adhered device with suction power detection mechanism to timely warn a user of a loosened suction cup and therefore prevent any possible accidents caused by the loosened suction-adhered device.

To achieve the above and other objects, the suction-adhered device with suction power detection mechanism according to the present invention includes a main body, suction cup units, and suction power detection units. The main body is provided at predetermined positions with chambers. A long hole is provided at a lower side of the main body near each chamber, and a window is provided on an upper side of the main body corresponding to the long hole. Each of the suction cup units includes a suction cup received in the chamber, and a safety lever partially projected from the upper side of the main body and movably connected to the suction cup with an elastic element mounted between them. Each of the suction power detection units includes a probe received in the long hole to partially downward project therefrom, and an indicating member visible via the window. When the suction cup is loosened from a mounting surface, the indicating member is automatically pushed by an elastic element to show a warning indicating zone thereof at the window, so that a user may be timely warned to re-mount the main body.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
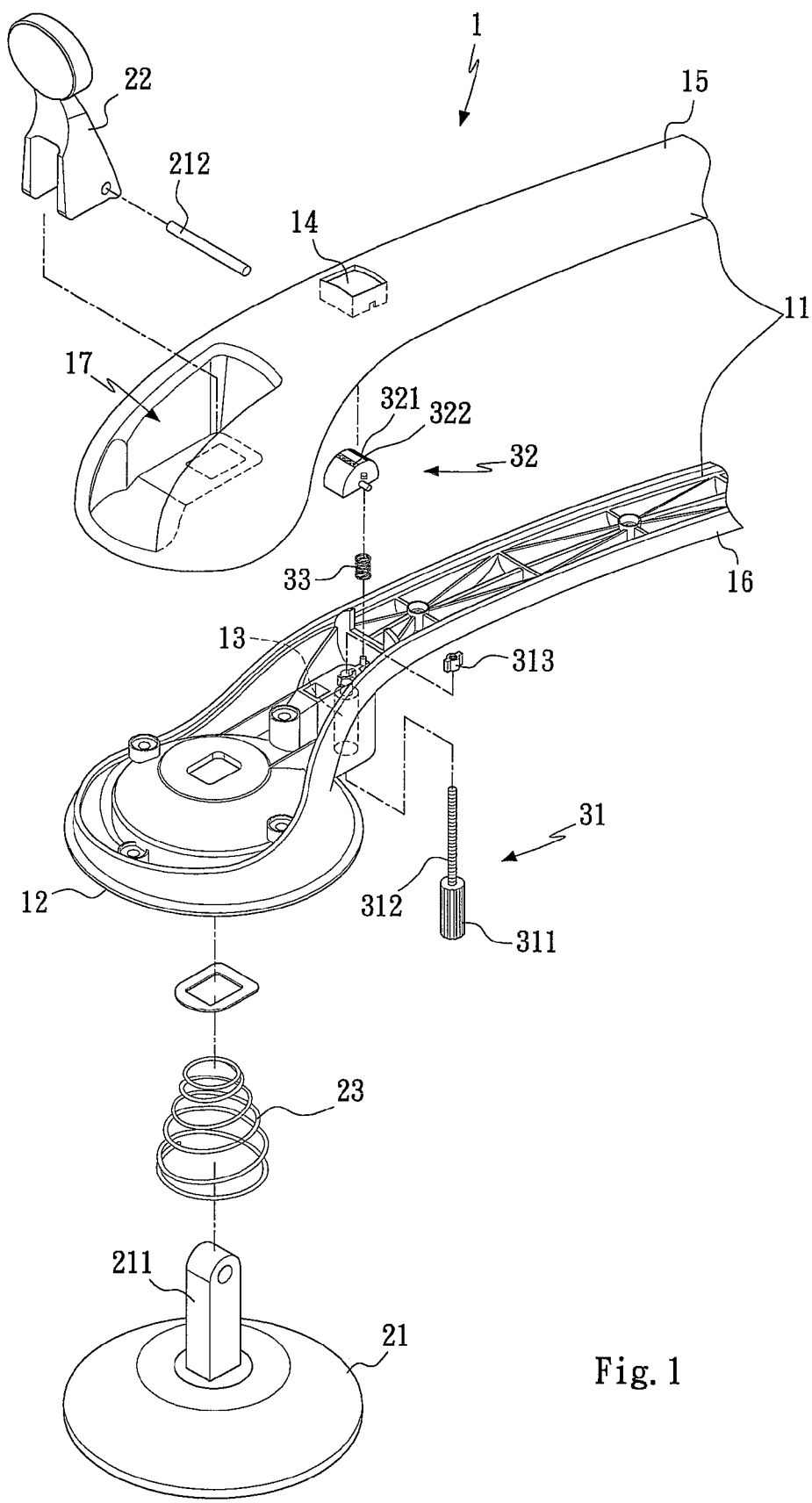
FIG. 1 is a fragmentary exploded perspective view of a suction-adhered device with suction power detection mechanism according to a preferred embodiment of the present invention.
Figure 2:
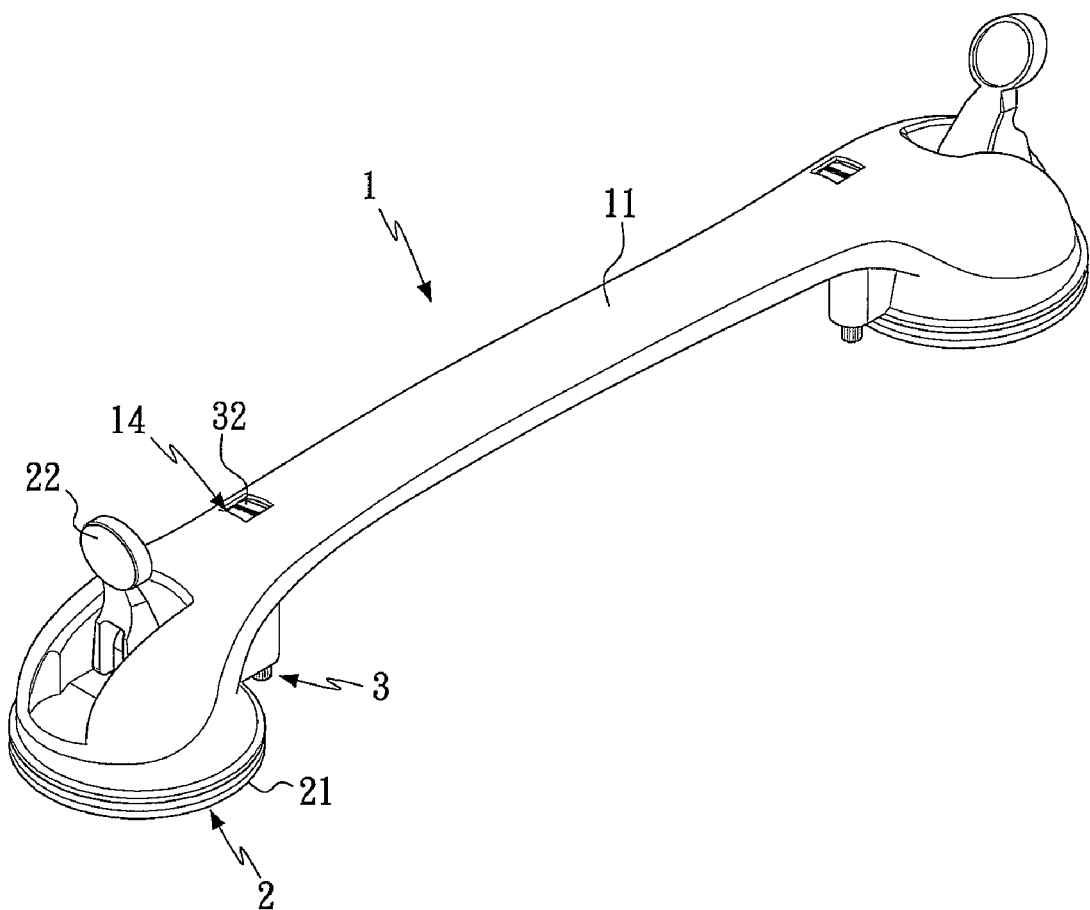
FIG. 2 is an assembled perspective view of the suction-adhered device with suction power detection mechanism according to the present invention.

Please refer to FIGS. 1 and 2 that are exploded and assembled perspective views, respectively, of a suction-adhered device with suction power detection mechanism according to a preferred embodiment of the present invention. As shown, the suction-adhered device of the present invention includes a main body 1, at least two suction cup units 2, and at least two detection units 3. The main body 1 is firmly suction-adhered to a desired wall surface via the suction cup units 2, and suction power of the two suction cup units 2 may be separately detected via the two suction power detection units 3 to prevent the main body 1 from unexpectedly loosening from the wall surface.

The main body 1 is a support unit 10. In the illustrated preferred embodiment of the present invention, the main body 1 is a support unit 10. The support unit 10 includes a handle bar 11 with two bent ends extended in the same direction, a chamber 12 formed below each of the two bent ends of the handle bar 11, a long hole 13 provided on the handle bar 11 near each of the chambers 12, and a window 14 provided on the handle bar 11 vertically corresponding to each of the long holes 13. The support unit 10 is formed from an upper case 15 and a lower case 16. The chambers 12 and the long holes 13 are located at two ends of the lower case 16. The upper case 15 is provided at each of two ends with a recess 17, which is communicable with the chamber 12 correspondingly formed on the lower case 16. And, each of the windows 14 is formed on the upper case 15 at a predetermined position in the vicinity of the recess 17 correspondingly formed on the upper case 15.

The suction cup units 2 are separately connected to the two bent ends of the handle bar 11. Since the suction cup units 2 are identical in structure, only one of them is described herein. As shown, the suction cup unit 2 includes a suction cup 21, which is received in the chamber 12 below one end of the handle bar 11, and has an upward extended post 211; a safety lever 22 seated in the recess 17 to partially project therefrom, and movably connect to the suction cup 21 via a connecting pin 212 extended through the safety lever 22 and the post 211 of the suction cup 21; and an elastic element 23 located between the suction cup 21 and the safety lever 22.

The suction power detection units 3 are separately mounted in the long holes 13 on the handle bar 11. Since the suction power detection units 3 are identical in structure, only one of them is described herein. As shown, the suction power detection unit 3 includes a probe 31 consisting of a push head 311, a screw rod 312 extended from an inner end of the push head 311, and a nut 313 screwed to a free end of the screw rod 312; an indicating member 32 movably mounted in the handle bar 11 between the nut 313 of the probe 31 and the window 14 on the upper case 15 of the handle bar 11; and an elastic element 33 fixedly mounted between the lower case 16 and a bottom of the indicating member 32. The probe 31 is received in the long hole 13 on the lower case 16 with the push head 311 partially downward projected from the long hole 13. The nut 313 upward presses against the bottom of the indicating member 32 at a point opposite to the elastic element 33. A top surface of the indicating member 32 facing the window 14 is provided with two indicating zones 321, 322, that have different colors, such as red and green, respectively.

Figure 3:
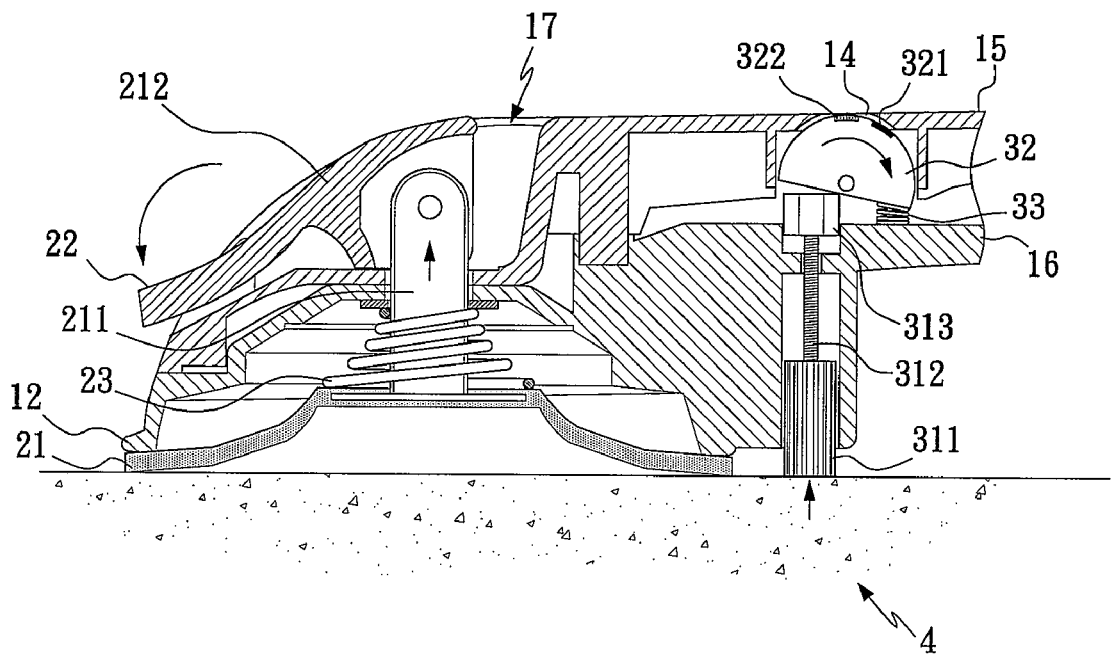
FIG. 3 is a fragmentary sectional view showing the suction-adhered device of the present invention is firmly adhered to a wall surface.
Figure 4:
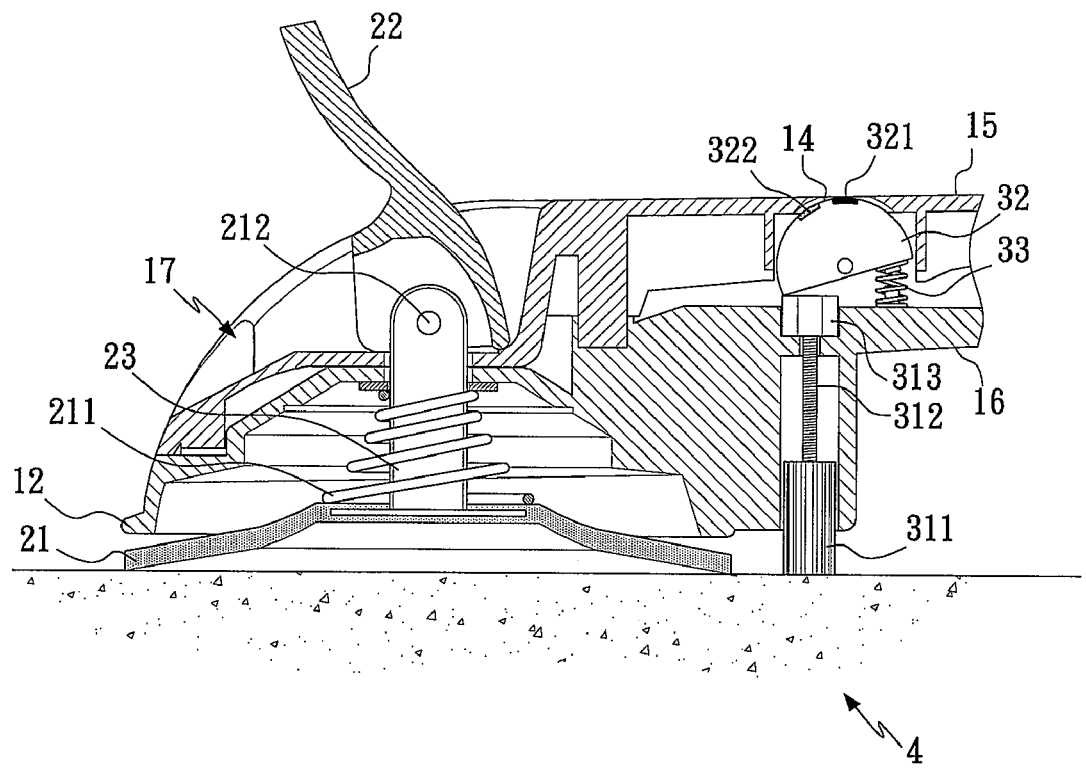
FIG. 4 is a fragmentary sectional view showing the suction-adhered device of the present invention is loosened from a wall surface.

Please refer to FIGS. 3 and 4 that are fragmentary sectional views showing the suction-adhered device of the present invention firmly adhered to a wall surface and loosened from the wall surface, respectively. As shown, to install the suction-adhered device of the present invention on a desired wall surface 4, first firmly press the suction cup units 2 against the wall surface 4, and then push the safety levers 22 downward to thereby pull the posts 211 of the suction cups 21 upward. At this point, the suction cups 21 become closer to the wall surface 4, and air between the suction cups 21 and the wall surface 4 is forced out of the suction cups 21, allowing the suction cup units 2 to tightly adhere to the wall surface 4 via the suction cups 21. As a result, the support unit 10 is adhered to the wall surface 4 at a desired position. When the suction cup units 2 are suction-adhered to the wall surface 4, the push heads 311 of the probes 31 of the suction power detection units 3 partially projected from the long holes 13 are firmly pushed against the wall surface 4, causing the screw rods 312 extended from the push heads 311 and the nuts 313 screwed to the free ends of the screw rods 312 to move forward at the same time. At this point, the nuts 313 in contact with the bottoms of the indicating members 32 apply a forward force, causing the indicating members 32 to turn pivotally and compress the elastic elements 33. At this point, the green indicating zones 322 on the top surfaces of the indicating members are aligned with the windows 14 on the upper case 15 of the handle bar 11, indicating the suction cup units 2 are tightly suction-adhered to the wall surface 4. When the suction adhered device installed on the wall surface 4 has been used for a period of time, or the device is not stably assembled, or the safety levers 22 are not in the position to pull the suction cups 21 upward for the same to closely contact with the wall surface 4, one or more of the suction cup units 2 would become loosened from the wall surface 4. At this point, the push head 311 of the probe 31 of the suction power detection unit 3 adjacent to the loosened suction cup unit 2 is not tightly pressed against the wall surface 4, as shown in FIG. 4, and fails to move the screw rod 312 and the nut 313 forward to apply a sufficient force for turning the indicating member 32 and compressing the elastic element 33. Since the elastic element 33 is released from the compression force applied by the probe 31, it pushes the indicating member 32 to turn reversely, and the red indicating zone 321 is aligned with the window 14 to indicate that the suction cup unit 2 is no longer tightly suction-adhered to the wall surface 4. From the red indicating zone 321 visible at the window 14, a user is warned about the loosened support unit 10.

In practical use of the present invention, the screw rods 312 of the probes 31 may be turned relative to the nuts 313 to change a length by which the push heads 311 are projected from the long holes 13, so that the probes 31 of the suction power detection units 3 and the suction cups 21 of the suction cup units 2 may be located at the same plane to ensure accurate detection of the suction power of the suction cups 21 by the suction power detection units 3.

With the above arrangements, the suction-adhered device with suction power detection mechanism according to the present invention is able to effectively overcome the problems in the prior art, so that the main body of the suction-adhered device may be securely installed on the desired wall surface via the suction cup units, and is protected against undesirable loosening from the wall surface.

What is claimed is:

1. A suction-adhered device with suction power detection mechanism, comprising:

a main body, having a handle bar with two bent ends, wherein a chamber is located at a predetermined position of each bent end, and a long hole is provided on the handle bar near each of the chambers, in which the chambers and the long holes are separately positioned on the two bent ends of the handle bar, and a window is provided vertically corresponding to each long hole;

at least one suction cup unit including a suction cup received in the chamber on the main body, a safety lever partially projected from one surface of the main body and movably connected to the suction cup, and an elastic element mounted in the main body to locate between the suction cup and the safety lever; and at least one suction power detection unit including a probe mounted in the long hole of the handle bar of the main body with an outer end partially projected from the long hole, an indicating member mounted in the handle bar to locate between an inner end of the probe and the window on the main body, and an elastic element mounted in the handle bar to locate below a bottom of the indicating member opposite to the inner end of the probe; and the indicating member being provided on a top surface with two indicating zones.

2. The suction-adhered device with suction power detection mechanism as claimed in claim 1, wherein the main body is a support unit.

3. The suction-adhered device with suction power detection mechanism as claimed in claim 1, wherein the handle bar having two bent ends extended in the same direction, the chambers and the long holes are located at a lower side of the handle bar, and the windows corresponding to the long holes located on an upper side of the handle bar.

4. The suction-adhered device with suction power detection mechanism as claimed in claim 3, wherein the support unit is formed from an upper and a lower case closed to each other; the chambers and the long holes being provided on the lower case at two ends thereof; and two recesses being separately formed on two ends of the upper case to communicate with the chambers correspondingly provided below two ends of the lower case with the windows separately located in the vicinity of the recesses.

5. The suction-adhered device with suction power detection mechanism as claimed in claim 1, wherein the suction cup of the at least one suction cup unit includes an upward extended post, to which the safety lever is movably connected via a connecting pin.

6. The suction-adhered device with suction power detection mechanism as claimed in claim 1, wherein the probe includes a push head partially downward projected from the long hole, a screw rod extended from an inner end of the push head, and a nut screwed to a free end of the screw rod to contact with the bottom of the indicating member.

7. The suction-adhered device with suction power detection mechanism as claimed in claim 1, wherein the two indicating zones on the indicating member are in different colors for indicating a tightly adhered and a loosened suction cup, respectively.

* * * * *